Patented Aug. 15, 1933

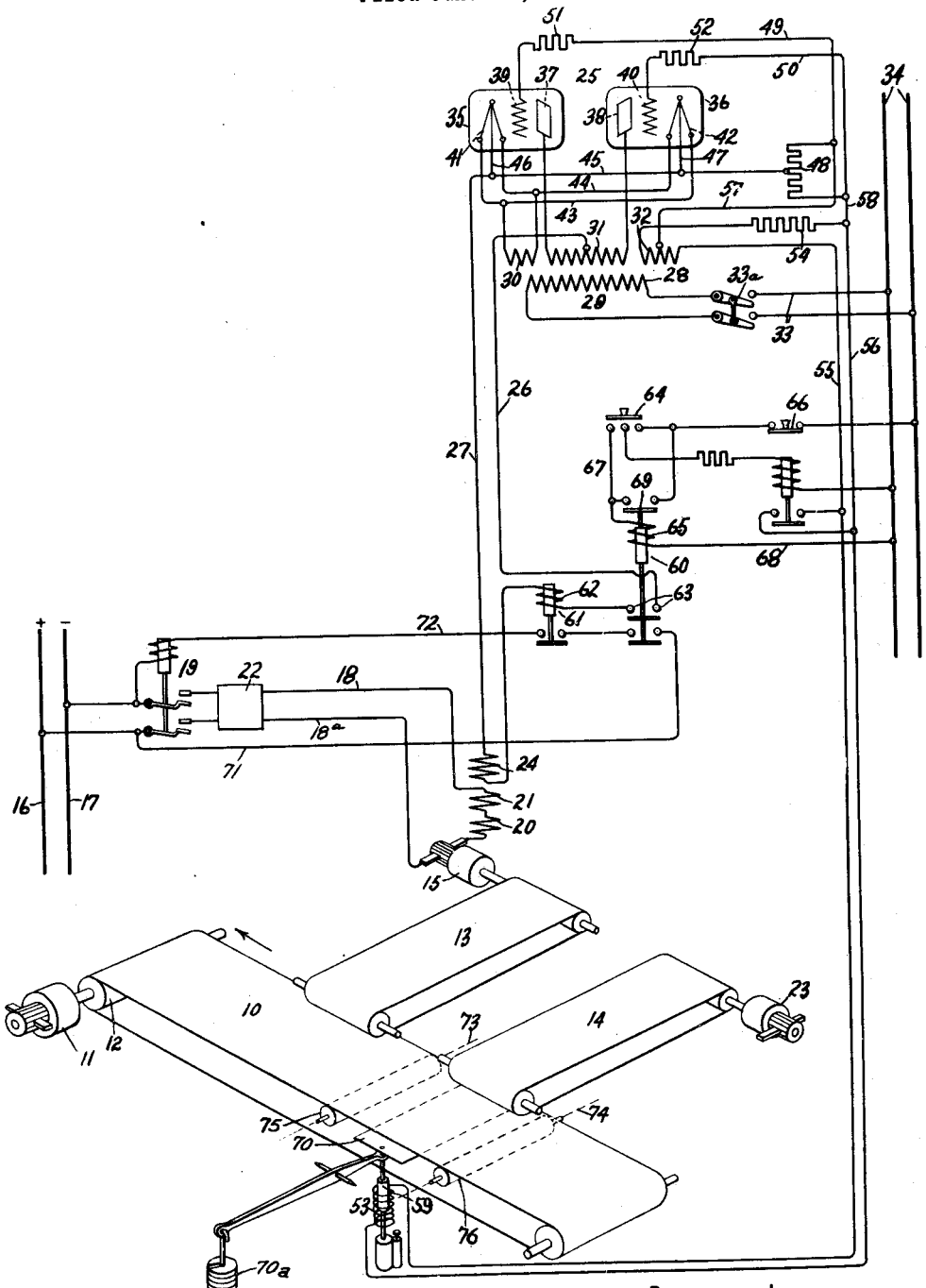

1,922,883

UNITED STATES PATENT OFFICE 1,922,883

MATERIAL HANDLING SYSTEM

Harry R. Crago, Schenectady, N. Y., assignor to General Electric Company, a Corporation of New York Application June 26, 1930. Serial No. 464,036

15 Claims. (Cl. 83—44)

This invention relates to material handling systems, more particularly to systems employing a plurality of power driven conveyors and has for an object the provision of a simple and efficient control system for automatically controlling the operation of the separate conveyors of the system.

More specifically this invention relates to material handling systems in which a plurality of conveyors are employed to supply different materials to a common conveyor so as to form a mixture thereon and accordingly a further object of the invention is the provision of a simple and reliable device for accurately controlling the relative rates at which the separate supply conveyors supply the different materials to the common conveyor in order to control accurately the percentages of the materials in the mixture.

In illustrating the invention in one form thereof, I have shown it as embodied in a conveyor system in which two supply conveyors supply different materials such for example as coke and limestone to a third conveyor which conveys the mixture of the materials to a kiln or other piece of apparatus wherein a desired process is carried out.

In carrying the invention into effect in one form thereof, I provide suitable electric discharge apparatus controlled by one material supplied to a common conveyor for controlling the rate at which another material is supplied thereto by a supply conveyor. More specifically, I provide electric discharge apparatus controlled by a material supplied to a common conveyor by a supply conveyor for controlling the speed of an electric motor employed to drive another supply conveyor supplying a second material thereto, in accordance with the rate at which the first material is supplied so as to maintain the relative percentages of the materials on the common conveyor substantially constant.

For a better and more complete understanding of the invention reference should now be had to the following specification and to the accompanying drawing the single figure of which is a diagrammatical representation of an embodiment of the invention.

Referring now to the drawing a conveyor 10 is driven at a speed, which is preferably substantially constant, by any suitable driving means such for example as the electric motor 11 to the drive shaft of which the conveyor drive roller 12 is directly connected as shown. Each of a plurality of supply conveyors 13 and 14 serves to deliver a separate material from suitable storage places such as bins or hoppers (not shown) to the common conveyor 10; the supply conveyor 13 supplying a material such for example as coke and the supply conveyor 14 supplying a different material such as limestone; whilst the common conveyor 10 serves to convey a mixture of these materials in the direction of the arrow to a kiln or other suitable apparatus in which they may be utilized for carrying out a desired process or other operation.

Although the supply conveyors 13 and 14 are shown conventionally as belt or apron type conveyors, it will be understood that they may be, and in practice usually are, of the bucket type. Conveyor 13 is driven by any suitable driving means such for example as the direct current electric motor 15 which is supplied from a suitable direct current source of supply, such for example as that conventionally represented in the drawing by the two supply lines 16 and 17, to the opposite sides of which the opposite terminals of the motor are respectively connected by means of the conductors 18 and 18a and the contacts of the line contactor 19 when the latter is operated to its upper or closed position; a series field winding 20 and a commutating field winding 21 being included in series relationship in the armature circuit of the motor as shown.

A suitable starting device 22 shown conventionally in the drawing for the sake of simplicity serves automatically to progressively exclude resistance from the armature circuit when the line contactor 19 is operated to its closed position in a manner that is well understood by persons skilled in the art.

A suitable driving means such for example as the electric motor 23 serves to drive the conveyor 14 at a speed which is preferably substantially constant, and this motor as well as the motor 11 which drives the common conveyor 10 is connected by means of conductors and switches (not shown) to any suitable supply source which may be and preferably is the source 16, 17 from which the motor 15 is supplied.

The motor 15 is also provided with a separately excited shunt field winding 24 which is supplied with direct current from suitable electric discharge apparatus 25, in the output circuit 26, 27 of which it is connected; the electric discharge apparatus 25 being in turn supplied with alternating current through a power transformer 28 which as shown comprises a primary winding 29 and the three secondary windings 31, 30, 32. The primary winding 29 of the power transformer is connected by means of conductors 33 to a suitable source of alternating current such for example as that conventionally represented in the drawing by the supply lines 34.

The electric discharge apparatus 25 is shown as comprising two separate electric discharge devices 35 and 36. These devices are of the three electrode type as shown; they being respectfully provided with plates or anodes 37, 38, grids 39, 40 and filamentary cathodes 41, 42. Although these electric discharge devices may be of any suitable type they are preferably of the three electrode type into the envelopes of which a small quantity of inert gas or vapor such for example as mercury vapor is introduced after the envelopes have been exhausted; the presence of the inert gas or vapor within the envelope serving to permit of the formation of arc discharge and thus constituting the devices electrostatically or grid controlled arc rectifiers. A well-known characteristic of vapor electric devices of this nature is that an expenditure of a small amount of power in the input circuit serves to control a very large amount of power in the plate or output circuit of the apparatus. The cathodes 41 and 42 are heated to the necessary degree of incandescence by alternating current respectively supplied to these cathodes from the secondary winding 30 of the power transformer to the opposite terminals of which the cathodes 41 and 42 are connected in parallel by means of conductors 43 and 44.

As shown in the drawing the electric discharge devices 35 and 36 are connected for rectifying the full wave of the electromotive forces supplied from the source 34; that is to say the plates or anodes 37 and 38 of the devices are respectively connected to the opposite terminals of the secondary winding 31 of the power transformer, the mid-point of this secondary winding being connected through the output circuit 26, 27 to a common conductor 45 which as shown in the drawing is connected to the mid-points of the cathodes 41 and 42 by means of conductors 46 and 47.

Alternating electromotive forces are supplied to the grids 39 and 40 by means of a grid supply resistor 48 to the opposite terminals of which the grids are respectively connected by means of the conductors 49 and 50; suitable protective resistances 51 and 52 being included in circuit with the grids. The electromotive forces supplied to the grid supply resistor 48 are derived from a local electric circuit comprising a secondary winding 32 of the transformer and reactance device 53 and a resistor 54 all connected in series relationship with each other by means of the conductor 55 and 56; one terminal of the grid supply resistor 48 being connected to the midpoint of the secondary winding 32 of the transformer by means of a conductor 57 and the opposite terminal of the resistor being connected to the common point between the reactance 53 and the resistance 54 by means of a conductor 58.

As will be well understood by those skilled in the art, the rectified current which flows in the output circuit 26, 27 of the electric discharge apparatus 25 may be varied as desired by varying the phase relationship between the alternating electromotive forces which are respectively supplied to the grids and anodes of the electric discharge devices 35 and 36. For this purpose a movable soft iron core 59 for varying the reactance of the reactance coil 53 is supported in a position within the coil 53 which depends upon the weight exerted on the core by the weigh pan 70, the weights 70a and the amount of current flowing in the coil 53. The reactance of the reactance device 53 is variable between a maximum when the core member 59 is in its lower position and a minimum when the core is in its upper position. Variation of the position of the core member 59 in the coil 53 thus serves to vary the phase relationship between the currents flowing in the secondary windings 31 and 32 of the power transformer and consequently to vary the phase relationship between the electromotive forces that are respectively supplied to the anodes 37, 38 and the grids 39, 40 of the electric discharge devices 35, 36. As a result of this the current flowing in the output circuit 26, 27 will be varied and since the field winding 24 of the motor 15 is connected in the output circuit 26, 27 the speed of the motor 15 will likewise be varied in direct proportion.

A suitable contactor 60 is connected in the output circuit 26, 27 of the electric discharge apparatus and serves to complete the circuit for the field winding 24 of the motor. The armature of the contactor 19 is controlled by means of a control relay 61, the energizing winding 62 of which is connected in the output circuit 26, 27 in series relationship with the field winding 24 by means of the auxiliary contacts 63 when the contactor 60 is in its upper or closed position.

A starting switch diagrammatically shown in the drawing as a push button 64 serves when depressed to complete a circuit for the energizing winding 65 of the field contactor, this circuit being traced from one side of the supply source 34 through stop button 66 movable and stationary contacts 64, conductor 67, winding 65 and thence by way of conductor 68 to the opposite side of the supply source 34. The field contactor 65 is further provided with an auxiliary contact 69 which in the upper or closed position of the contactor serves to bridge its associated stationary contacts and thus to complete a holding circuit for the energizing winding 65 of the contactor independently of the starting button 64.

In the carrying out of certain processes in a kiln such for example as that supplied by the common conveyor 10 it is desirable that the relative percentages of the materials forming the mixture supplied thereto shall be substantially contsant; that is to say the ratio between the relative rates at which the separate materials or ingredients in the mixture are supplied to the common conveyor 10 must remain substantially fixed. It will at once be apparent that if the conveyor 14 which operates at a substantially constant speed is supplying a material such as limestone the pieces of which usually vary in size from minute fragments weighing a few ounces to large chunks weighing 8 pounds or more, that the weight of this material will be unevenly distributed along the conveyor 10 and consequently the rate at which this material is supplied will vary substantially in proportion with the weights of the successive pieces or chunks. Consequently the weight of the material upon any section of the conveyor 10 is a measure of the instantaneous rate at which that material is being supplied thereto.

On the other hand if the conveyor 13 is supplying material such as coke the sizes of the pieces of which are small and substantially uniform, the rate at which this material will be supplied to the common conveyor 10 will depend upon the speed at which the conveyor 13 is operated by its drive motor 15. In order, therefore, that the ratio between the rates at which the different materials are supplied to the conveyor 10 shall remain fixed it is necessary to vary the speed of the motor 15 in accordance with variations in the rate at which the first material, i. e., the limestone is supplied to conveyor 10. That is to say the speed of the motor 15 must be varied in accordance with the successive instantaneous weights of the limestone upon a given section of the conveyor. For this purpose a weigh-pan 70 is arranged beneath the section 73, 74 of the conveyor 10 between the conveyor supporting rolls 75, 76; the weigh-pan being supported upon the movable core member 59 of the reactance device which as previously pointed out serves to vary the speed of the motor 15 in accordance with its position within the coil 53.

With the above understanding of the elements and apparatus comprising my invention its operation will readily and easily be understood from the description which follows.

With the various controlling switches in the open positions in which they are shown in the drawing all the apparatus will be at rest. The electric discharge apparatus 25 is first energized by operating the switch 33a to the closed position to connect the primary winding 29 of the power transformer to the source 34. After the filamentary cathodes 41 and 42 have been heated to the requisite degree of incandescence the electric discharge device apparatus 25 will be in readiness to supply a rectified current through the output circuit 26, 27 to the field winding 24 of the electric motor 15.

Depression of the start button 64 serves to operate the field contactor 60 to its upper or closed position thereby connecting the field winding 24 in the output circuit 26, 27 of the electric discharge apparatus; this circuit being traced from either of the cathodes 41, 42 to the conductor 27 through the field winding 24 of motor 15, energizing winding 62 of the control relay 61, main contact 63 of the field contactor 60, conductor 26 to the mid-point of secondary winding 31 and thence to either of the anodes 37, 38. The flow of current in the energizing winding 62 will cause the control relay 61 to be operated to its upper position in which it completes a circuit for the energizing winding of the line contactor 19, this circuit being traced from the positive side 16 of the direct current supply source by way of conductor 71 to the lower auxiliary contacts of the field contactor 60, contacts of control relay 61, conductor 72, coil of line contactor 19 and thence to the negative side 17 of the supply source. Contactor 19 in responding to the energization of its coil moves to its upper or closed position in which it completes a circuit in the armature of motor 15 which circuit may be traced from the positive side 16 of the supply source through the lower contact of the line contactor, automatic starting device 22, conductor 18a, armature of the motor 15, series and commutating field windings 20 and 21, conductor 18, upper contact of line contactor to negative side 17 of the supply source.

The energizing of the armature and field windings of motor 15 causes the latter to rotate and to drive the conveyor 13 at a speed dependent upon the energization of the field winding 24 as is well understood by persons skilled in the art. The movable core member 59 will assume a position that is dependent upon the weight of the material upon the section 73, 74 of the conveyor 10 and also upon the amount of current which flows in the winding 53.

As long as the rate at which the limestone or other material supplied by the conveyor 14 to the conveyor 10 is substantially constant the movable core member 59 which supports the weigh-pan 70 will remain balance in this assumed position by the instantaneous weight of the material on the weight-pan, the weights 70a and the current in coil 53 and the control apparatus will remain inactive. However, should the rate of material supplied to the conveyor 10 vary due to variations in the sizes of the pieces supplied thereto or otherwise, the weigh-pan 70 will move the core member 59 upwardly or downwardly, as the case may be in response to the weight of the pieces greater or less than that weight which is just sufficient to maintain the movable core member 59 in the aforementioned position. For example, should a large chunk of limestone be deposited upon the conveyor 10 the weigh-pan 70 will depress the core 59 within the coil 53 thereby changing the reactance of the circuit across which the grid supply resistor 48 is connected and thereby shifting the phase relationship between the electromotive forces applied to the anodes 37, 38 and the grids 39, 40 in such a manner as to decrease the current through the output-circuit 26, 27 to the field winding 24 thereby increasing the speed of the motor 15 so as to cause the conveyor 13 to supply a greater amount of coke to the conveyor 10 and thus to maintain the percentages of the amounts of coke and limestone substantially constant.

On the other hand should the amounts of limestone supplied by the conveyor 14 decrease below the amount necessary to maintain the core member 59 in its average position within the coil 53, the weigh-pan will move in an upwardly direction and shift the phase relationship between the grid and anode potentials in the opposite sense of that above described, and thus increase the current supplied through the output circuit 26, 27 and the field winding 24 and thereby decrease the speed of the motor 15 so as to decrease the amount of coke supplied by the conveyor 13 to the conveyor 10 and thereby maintain the ratio of the amounts of material in the mixture on the conveyor 10 substantially constant.

The relative rates at which the two materials are supplied to the common conveyor 10 may be adjusted as desired by varying the weights 70a upon the balance arm of the scale, since a variation of the weights 70a will change the position of the core member 53 in the coil 59 and thus change the speed of the motor 15 and consequently the rate at which the conveyor 13 supplied material to the conveyor 10, in the above described manner.

It will thus be seen that any variation in the rate at which material is supplied by the conveyor 14 to the conveyor 10 will effect a variation in the reactance of the reactive coil 53 and a variation in the phase relationship between the grid and anode potentials of the electrode discharge apparatus and consequently the current supplied to the field winding 24 of the motor in such a manner as to change the speed of the motor to maintain the percentages of the materials at the desired values.

In the event of failure of the alternating current source 34 the energizing winding 65 of the field contactor will become deenergized and the contactor will descend to its lower position in which it interrupts the energizing circuit for the line contactor 19 and permits the latter to open and interrupt the armature circuit of the motor 15. Similarly in the event of failure of either or both of the electric discharge devices 36, 37 the output circuit 26, 27 in which the energizing winding 62 of the control relay is connected will become currentless and will thus permit the latter to interrupt the energizing circuit of the line contactor which in turn will interrupt the armature circuit of the motor 15. It will thus be clear that the line contactor is interlocked both with the alternating current source 34 and with the field circuit of the motor and consequently the motor is protected against starting with an open field and is likewise protected at all other times against failure of field excitation.

Although in accordance with the provisions of the patent statutes I have described this invention as embodied in concrete form I would have it understood that the invention is not limited to the particular apparatus and connections shown and described which are merely illustrative, and since alterations and modifications will readily suggest themselves to persons skilled in the art without departing from the true spirit of this invention or from the scope of the annexed claims.

What I claim as new and desire to secure by Letters Patent of the United States, is,—

1. In a material handling system having means for conveying a material and means for supplying a second material to said conveying means, means comprising electric discharge apparatus for controlling the rate of supply of said supply means, and means responsive to the instantaneous rate of supply of said first mentioned material on said conveying means for controlling said electric discharge apparatus.

2. In a material handling system having means for conveying a material and means for supplying a material to said conveying means, means comprising electric discharge apparatus for controlling said supply means, and means comprising a reactance device responsive to the material supplied to said conveying means for controlling said electric discharge apparatus so as to control the rate of supply of said supply means.

3. A control system for material handling apparatus and the like having a conveyor for conveying a material means for supplying a second material thereto comprising electric discharge apparatus for controlling said material supplying means, and means responsive to variations in the distribution of said first mentioned material upon said conveying means for controlling said electric discharge apparatus to control the supply means for said second material.

4. In a material handling system having a plurality of devices for supplying material, means comprising electric discharge apparatus for controlling a first one of said supply devices, and means continuously controlled by the rate of the material supplied by a second one of said supply devices for continuously controlling said electric discharge apparatus so as to cause said first mentioned supply device to deliver material in predetermined proportion to the material delivered by said second supply device.

5. A control system for material handling apparatus and the like having a plurality of devices for supplying material comprising electric discharge apparatus for controlling a first of said supply devices, and means responsive to the weight of the material delivered by a second of said supply devices for controlling said electric discharge apparatus to control the amount of material supplied by said first supply device.

6. In a material handling and mixing system having a plurality of supply devices for supplying different materials, means for controlling the instantaneous rate of supply of material from a first one of said supply devices, and means responsive to the instantaneous rate of supply of material from another of said supply devices for controlling said control means so as to cause the material to be delivered from said first supply device in predetermined proportion to the material delivered by said other supply device.

7. A material handling system comprising a plurality of devices for supplying material, means for controlling the rate of supply of a first of said supply devices, an electric circuit connected to said control means, a solenoid connected to said circuit and having a relatively movable core, and means responsive to variations in the rate of supply of another of said supply devices for effecting relative movement between said solenoid and core to cause said control means to vary the rate of supply of material from said first supply device to maintain a predetermined ratio between the supply rates of said devices.

8. A control system for a material handling and mixing apparatus having a plurality of devices for supplying different materials comprising an electric circuit, means controlled by variations in the rate of the material supplied from one of said devices for controlling an electrical condition of said circuit, and means controlled by said electrical condition for controlling the rate of supply of another of said supply devices.

9. A control system for material handling and mixing apparatus having a plurality of devices for supplying different materials comprising an electric circuit, means continuously responsive to variation in the instantaneous rate of supply of one of said materials for varying an electrical condition of said circuit, and means responsive to variation of said electrical condition for varying the instantaneous rate of supply of another of said materials.

10. A control system for a material handling and mixing apparatus having a plurality of devices for supplying different materials comprising in combination, an electric circuit, a variable reactance device responsive to the rate of supply of one of said materials for effecting variations in an electrical condition of said circuit, and means responsive to said variations in said electrical condition for varying the rate of supply of another of said materials to maintain a predetermined relationship between the rates of supply of said materials.

11. A material handling system comprising a first conveyor, means including a second conveyor for supplying a material to said first conveyor at a substantially constant rate, means including an electric motor and a conveyor driven thereby for supplying a second material to said first conveyor, and means including electric discharge apparatus for responding to variations in the supply rate of said second conveyor for controlling the speed of said motor so as to maintain the relative percentages of materials supplied to said first conveyor substantially constant.

12. A material handling system comprising a first conveyor, means including a second conveyor for supplying a material to said first conveyor, means including an electric motor and a conveyor driven thereby for supplying a second material to said first conveyor and means including a variable reactance device and electric discharge apparatus controlled thereby for responding to variations in the supply rate of said second conveyor for varying the speed of said motor to control the relative amounts of materials supplied to said first conveyor.

13. In a material handling system, a conveyor, means for supplying a material thereto, electric discharge apparatus provided with input and output circuits, means including a reactance device connected to said input circuit for responding to variations in the supply rate of said material for effecting variations in the current in said output circuit and means including an electric motor controlled by said current variations and a conveyor driven by said motor for supplying a second material to said first mentioned conveyor.

14. In a material handling system, a conveyor, means for supplying a material thereto, means including an electric motor and a conveyor driven thereby for supplying a second material to said first mentioned conveyor, electric discharge apparatus having an output circuit connected to said motor and an input circuit for controlling said output circuit, means for supplying alternating electromotive forces to said circuits, and means including a variable reactance device for responding to variations in the supply rate of said first mentioned material for varying the phase relationship between said electromotive forces to vary the current in said output circuit and the speed of said motor so as to maintain the relative supply rates of said materials substantially constant.

15. A material handling system comprising a first conveyor, means including a second conveyor for supplying a material to said first conveyor at a substantially constant rate, means including an electric motor and a conveyor driven thereby for supplying a second material to said first conveyor, means including electric discharge apparatus for responding to variations in the supply rate of said second conveyor for controlling the speed of said motor so as to maintain the relative percentages of materials supplied to said first conveyor substantially constant, and means for adjusting the speed of said motor to adjust the relative percentages of said materials.

HARRY R. CRAGO.